United States Patent [19]

Deutscher et al.

[11] Patent Number: 5,456,215
[45] Date of Patent: Oct. 10, 1995

[54] PROTECTIVE HEAD COVER FOR ANIMALS

[76] Inventors: Linda M. Deutscher; David V. Deutscher, both of 5555 40th St. SE., Medina, N. Dak. 58467-6806

[21] Appl. No.: 278,825

[22] Filed: Jul. 22, 1994

[51] Int. Cl.$^6$ ................................................ A01K 13/00
[52] U.S. Cl. ........................................ 119/850; 54/80.1
[58] Field of Search ..................................... 119/715, 814, 119/836, 837, 850, 851; 54/80.1, 80.2, 80.3, 80.4, 80.5; 606/204.15, 204.25, 204.55; 2/410, 4, 423

[56] References Cited

U.S. PATENT DOCUMENTS

| | | | |
|---|---|---|---|
| 584,947 | 6/1897 | Lundborg | 54/80.3 |
| 2,407,029 | 9/1946 | Miller | 119/850 |
| 3,104,508 | 9/1963 | O'Hare, Jr. | 119/850 |
| 4,040,239 | 8/1977 | Powell | 119/850 |
| 4,756,145 | 7/1988 | Pelling | 119/850 |
| 4,823,540 | 4/1989 | Kosarek | 54/80.1 |
| 5,163,272 | 11/1992 | Finley et al. | 54/80.1 |

FOREIGN PATENT DOCUMENTS 2184931  7/1987  United Kingdom ............ 119/836

Primary Examiner—Todd E. Manahan
Attorney, Agent, or Firm—David A. Lingbeck

[57] ABSTRACT

A Protective Head For Animals comprises a pair of sheet-like pieces of material fixedly connected to one another and each having an eye opening. The protective head cover further comprises, in particular, an adjustable, flexible strap which slidably extends through the sheet-like pieces of material and is supported and guided by a strap guide which is fixedly attached to the undersides of the sheet-like pieces of material. The strap is adapted to allow the ears of the animal to nondeformably fit between the sheet-like pieces of material and the strap so that the strap does not cross over the ears thus cutting off the circulation of blood through the ears. The protective head cover urges the ears to rest essentially flat against the neck of the animal to allow the heat of the body to warm the ears.

11 Claims, 3 Drawing Sheets

PROTECTIVE HEAD COVER FOR ANIMALS

BACKGROUND OF THE INVENTION

1. Technical Field

This invention relates generally to protective hoods for animals. More specifically this invention relates to a protective head cover for animals to warm the ears of newborn bovine calves in particular so as to prevent the ears from becoming frostbitten or from freezing due to cold weather, which causes irreparable damage not only to the calves themselves but also to the value of the calves on the market.

2. Description of the Related Art

In northern climates, domestic animals such as cows often birth their young in the open leaving them exposed environment which when the weather is extremely cold will often damage the ears of the newborn animals if steps are not taken to protect the ears of the animals. The ears of the animals may become frostbitten resulting in the animals losing their ears which could substantially devalue the worth of the animals since appearance of the animals tend to have a psychological affect on the attitudes of the buyers of the animals especially for breeding purposes. A calf having lost at least a portion of an ear or ears will not be worth as much on the market as a calf having two good ears.

Various types of hoods have been developed to protect the head of an animal and to protect other areas of the body of the animal. However, none of the hoods or prior art describes or suggests the protective head cover of the present invention.

One known prior art is a STRETCHABLE ONE-PIECE HOOD, U.S. Pat. No. 4,823,540, comprising a sleeve fitted about the neck and head of a horse and having ear, eye, and muzzle, openings for training the mane and polishing the coat.

Another known prior art is a PROTECTIVE BONNET FOR ANIMALS, U.S. Pat. No. 3, 753,334, comprising straps connected to a pair of bands and further comprising a sheet of material adapted to bulge outwardly from the face of the animal.

Another known prior art is a REFLECTIVE HEAT INSULATING COATING FOR ANIMALS. U.S. Pat. No. 2,826, 169, comprising a covering about the major portion of the outer surface of the animal.

Another known prior art is a GARMENT FOR LONG-EARED DOGS, U.S. Pat. No. 2,136,115, a pair of upwardly opening flexible pockets in which the ears of the dog can hang.

Another known prior art is a HORSE BLANKET AND HOOD APPARATUS, U.S. Pat. No. 4,214,421, comprising improved strap and strap closure assemblies for connecting the blanket and the hood to the horse.

None of the prior art disclosed describes or suggests a protective hood which lays the ears of the animal nondeformably back against the animal's own neck without distorting the ears in any way so that the ears can be warmed from the heat generated by the animal's own body. There is a definite need for a protective head cover which will substantially warm and protect the ears of especially newborn calves by not deforming the ears and by using the natural heat emitted by the bodies of the animals and by not shutting off the blood circulation through the ears as is possible with the prior art.

SUMMARY OF THE INVENTION

The present invention relates to a protective head cover adapted to fits about the heads and necks of animals, in particular, about the heads and necks of newborn bovine calves to protect the ears of the animals. The protective head cover comprises two mirrored sheet-like pieces of material sewed or stitched together, each piece of material having an eye opening therethrough. Two fastener means such as VELCRO straps are fixedly attached to a side edge of one of the pieces of materials for closing the protective head cover about the head and neck of the animal by attaching the other ends of the fastener means to the other piece of material. An adjustable, flexible strap means slidably extends through both sheet-like pieces of material and is supported by a strap guide means having ends fixedly attached to the underside of the pieces of material along the seam joining the two pieces of material. The adjustable, flexible strap means essentially holds the protective head cover about the head and neck of the animal. When disposed about the head and neck of the animal, the protective head cover extends from near the muzzle of the animal to the neck region of the animal.

One objective of the present invention is to provide a protective head cover which protects the animal's ears from becoming frostbitten.

Another objective of the present invention is to provide a protective head cover which urges the ears to lay back against the neck of the animal in their natural shape without distorting or bending the ears.

Also, another objective of the present invention is to provide a protective head cover which urges the animal's ears to lay back against the animal's neck which provides the heat to warm the ears.

Further, another objective of the present invention is to provide a protective head cover which allows the animal to move about unrestrictively and which is lightweight and doesn't weigh the animal down and, yet, substantially protects the ears of the animal and allows the animal to feed without providing any annoyance to the animal.

Yet, another objective of the present invention is to provide a protective head cover which is easy for the user to fit about the head and neck of the animal and which substantially lessens any possible danger to the animal should the animal roam close to barriers of any kind.

Further objectives and advantages of the present invention will become apparent as the description proceeds and when taken in conjunction with the accompanying drawings wherein:

DETAILED DESCRIPTION OF THE INVENTION

Figure 5:
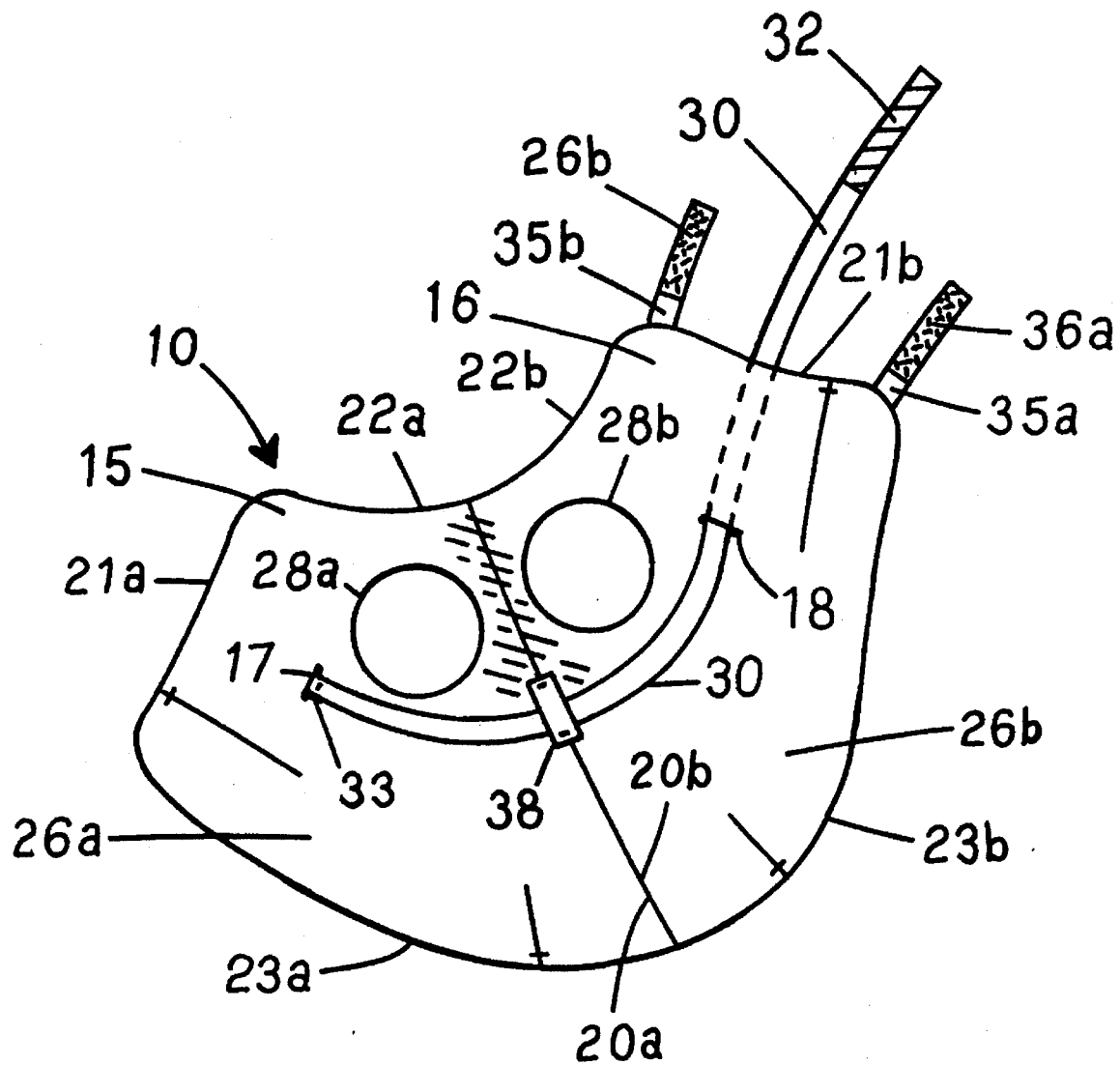
FIG. 5 is plan view of the underside of the protective head over showing the strap guide means.

Referring to FIGS. 1 through 5, in particular, the protective head cover 10 for animals comprises two mirrored sheet-like pieces of material 15 & 16 each of which has a top edge 20a or 20b, a bottom edge 21a or 21b, a front edge 22a or 22b, a back edge 23a or 23b, an outerside 25a or 25b, and an underside 26a or 26b. The two mirrored sheet-like pieces of material 15 & 16 are fixedly attached or sewed together along the fop edges 20a or 20b thereof. An eye opening 28a or 28b extends through each sheet-like piece of material 15 or 16 near the front edge 22a or 22b and near the top edge 20a or 20b thereof. A pair of fastener means 36a & 36b such as VELCRO have ends 35a & 35b which are fixedly attached to one of the sheet-like pieces of material 16 near the bottom edge 21b thereof, one fastener 36b means being near the front edge 22a of the sheet-like piece of material 15 and the other fastener means 36a being near the back edge 23a of the sheet-like piece of material 15 and both fastener means 35a & 35b, preferably, being fixedly attached to the outerside 25b of the sheet-like piece of material 16. As shown in FIG. 5, a strap guide means 38 has ends which are fixedly attached or sewed to the undersides 26a & 26b of the sheet-like pieces of material 15 & 16 along the joined top edges 20a & 20b of the sheet-like pieces of material 15 & 16 approximately midway between the front edges 22a & 22b and back edges 23a & 23b of the sheet-like pieces of material 15 & 16, thus forming a loop. An adjustable, flexible strap means 30 slidably extends through slits 17 & 18 in the sheet-like pieces of material 15 & 16 and extends through and is carried by the strap guide means 38 on the undersides 26a & 26b of the sheet-like pieces of material 15 & 16 and has ends 32 & 33 which extend to the outersides 25a & 25b of the sheet-like pieces of material 15 & 16 for securing the protective head cover 10 about the head 40 and 25 neck 42 of the animal. The slits 17 & 18 extending through the sheet-like pieces of material 15 & 16 are spaced from the strap guide means 38 to allow the ears 45 of the animal to fit nondeformably between the strap guide means 38 and the slits 17 & 18. The slits 17 & 18 in the sheet-like pieces of material 15 & 16 are spaced between the top edges 20a & 20b and bottom edges 21a & 21b thereof. The strap means 30 can be slackened or adapted on the undersides 26a & 26b of the sheet-like pieces of material 15 & 16 to allow the ears 45 of the animal to nondeformably fit between the sheet-like pieces of material 15 & 16 and the strap means 30 so that the strap means 30 isn't disposed across the ears 45.

Figure 1:
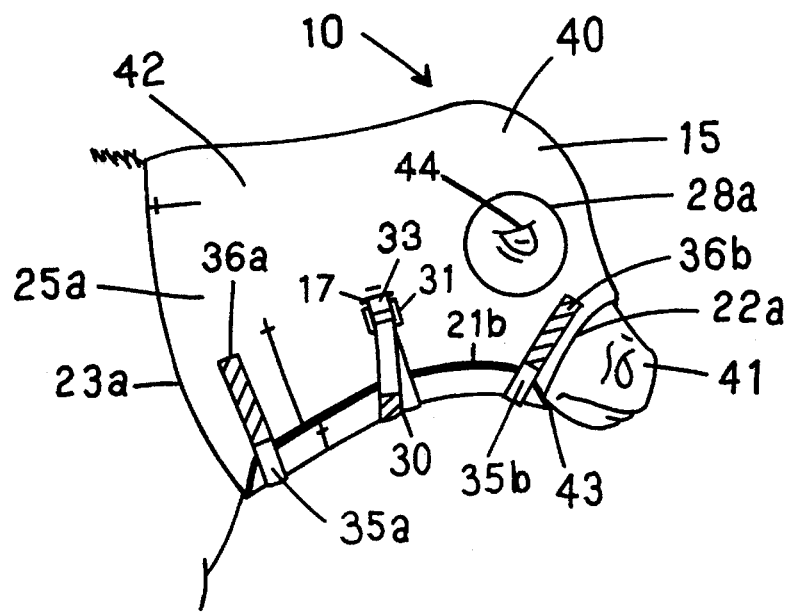
FIG. 1 is a perspective view of the protective head cover fastened about the head of a calf.
Figure 2:
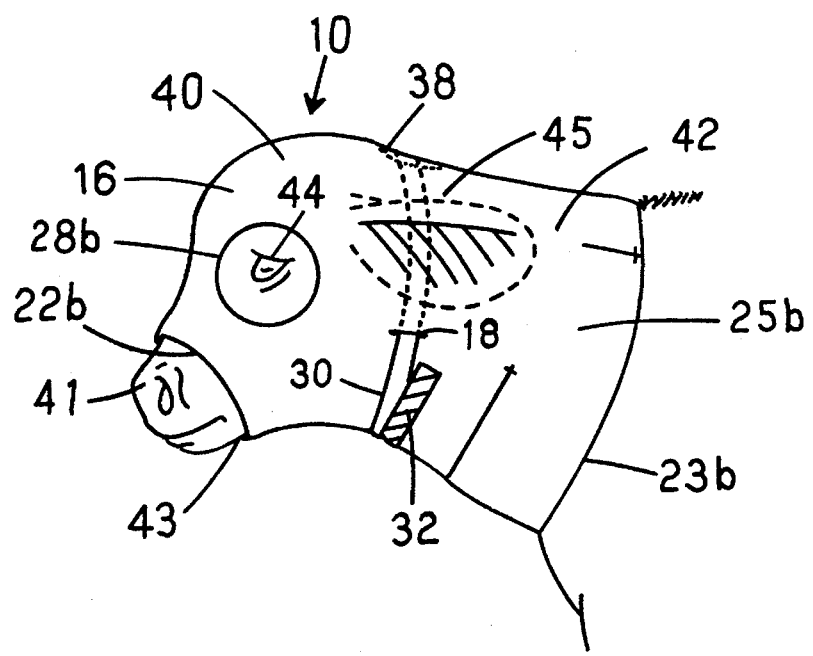
FIG. 2 is a perspective view of the protective head cover fastened about the head of a calf showing, in particular, the hidden lines of a portion of the head and neck strap disposed between the ears and neck of the animal.
Figure 3:
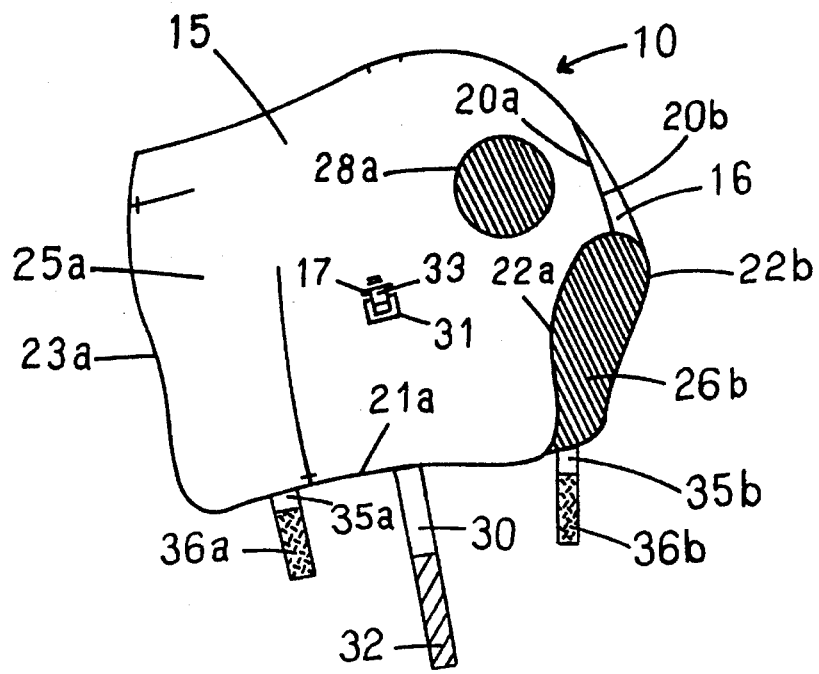
FIG. 3 is a side view of the protective head cover, showing one of the mirrored half members.
Figure 4:
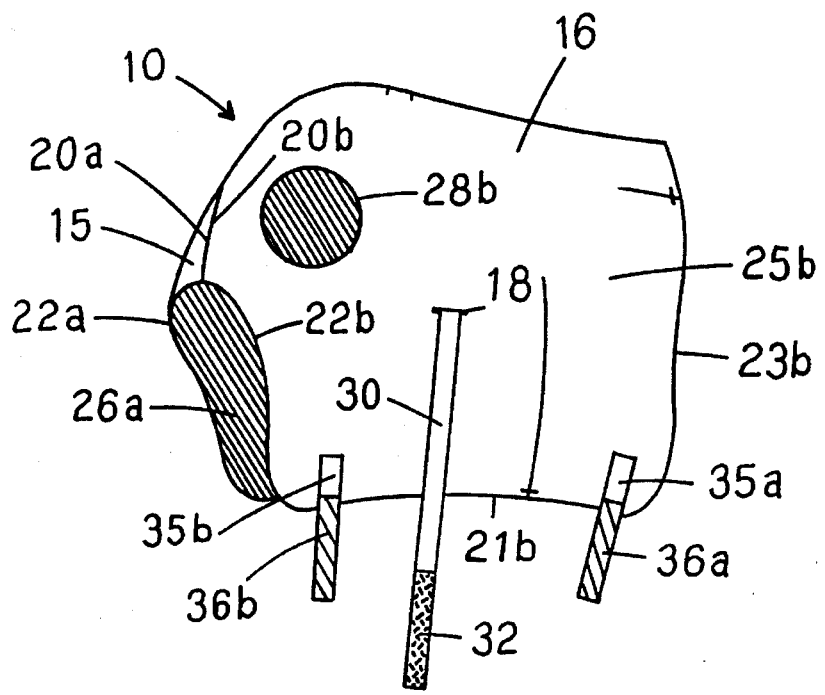
FIG. 4 is a side view of the protective head cover, showing the other mirrored half member.

As illustrated in FIGS. 1 and 2, the protective head cover 10, when disposed about the head 40 and neck 42 of the animal, extends from near the muzzle 41 of the animal to the neck region 42 of the animal. The top edges 20a & 20b of the connected sheet-like pieces of material 15 & 16 extend along the top of the animal's head from the muzzle 41 to the neck region 42. The eye openings 28a & 28b are aligned over the eyes 44 of the animal, and the bottom edges 21a & 21b of the sheet-like pieces of material 15 & 16 detachably attaches with the fastener means 36a & 36b and the strap means 30 to one another beneath the animal's jaw 43 and neck 42. The front edges 22a & 22b of the two sheet-like pieces of material 15 & 16 are adapted to fit about the muzzle 41 and jaw 43 of the animal. The back edges 23a & 23b of the two sheet-like pieces of material 15 & 16 are adapted to fit about the neck 42 of the animal. The strap means 30 essentially secures the protective head cover 10 about the head 40 and neck 42 of the animal. The sheet-like pieces of material are preferably made of an insulating synthetic rubber material namely neoprene which is substantially resistant to ozone, weathering and various chemicals.

To use the protective head cover, the user essentially drapes the protective head cover over the head and neck of the animal with the front edges of the connected sheet-like pieces of material disposed toward the muzzle of the animal and the back edges of the sheet-like pieces of material disposed behind the head of the animal and with the top edges of the joined sheet-like pieces of material disposed on top of the head of the animal and the bottom edges of the sheet-like pieces of material disposed under the neck and jaw of the animal. The user should arrange the strap means which extends through the sheet-like pieces of material to the undersides of the sheet-like pieces of material and through the strap guide means so that the strap means is disposed behind the crown of the head of the animal and behind the ears of the animal or between the ears and head of the animal and under the neck of the animal so that the ears of the animal are between the strap means and the sheet-like pieces of material. The user should not extend the strap means over the ears, because as the protective head cover is securely tightened about the head with the fastener means and the strap means, the strap means would essentially function as a tourniquet and cut off the circulation of blood through the ears, thus eventually damaging the ears of the animal. Once the user has positioned the strap means behind the ears or between the ears and head, the user can extend a first end of the strap means through a tuck loop or dee ring 31 fixedly attached at a second end of the strap means and can detachably fasten the first end of the strap means back over onto the strap means to secure the protective head cover about the head and neck of the animal. The strap means preferably has VELCRO at the first end thereof so that the strap means can be easily secured about the head of the animal and can also be easily removed from the head of the animal. The two fastener means can also be fastened to the other sheet-like piece of material, one under the muzzle of the animal and the other under the neck, to further secure the protective head cover about the head and neck of the animal.

What is claimed is:

1. A protective head cover comprising: a pair of sheet-like pieces of material fixedly connected together and adapted for essentially covering an animal's ears and urging said ears to rest nondeformably against the neck of the animal so that heat from the head and neck of the animal warms said ears, each of said sheet-like pieces of material having an eye opening therethrough, and further having an underside and an outerside, an adjustable, flexible strap means extending through said sheet-like pieces of material for securely fastening said protective head cover about the head of the animal, said sheet-like pieces of material having a strap guide means for supporting and carrying said strap means and further having front edges, back edges, bottom edges, and top edges, said connected sheet-like pieces of material extending from near the muzzle of the animal to the neck region being sized to extend of the animal, and further said sheet-like pieces of material having slits therethrough, through which said strap means slidably extends, said slits being spaced between said bottom edges and said top edges and being spaced from said strap guide means so that the ears of the animal nondeformably fit between said slits and said strap guide means; and at least one fastener means for detachably fastening said sheet-like pieces about the head of the animal.

2. A protective head cover as described in claim 1, wherein said strap means extends to said undersides of said sheet-like pieces of material and are adapted to allow the ears of the animal to nondeformably fit between said strap means and said sheet-like pieces of material and to allow the ears of the animal to lay back against the animal's neck 3. A protective head cover as described in claim 2, wherein said sheet-like pieces of material are made from an insulating rubber material.

4. A protective head cover as described in claim 3, wherein said sheet-like pieces of material are made from neoprene.

5. A process of protecting the ears of animals comprises the steps of:

providing a protective head cover comprising two sheet-like pieces of material fixedly attached to one another and comprising a strap means slidably extending through said sheet-like pieces of material, said sheet-like pieces of material each having an eye opening;

positioning said protective head cover about the head of the animal to nondeformably rest the ears of the animal back against the animal's own neck and to align said eye openings over the eyes of the animal; and securing said protective head cover with said strap means about the head and neck of the animal.

6. A process of protecting the ears of animals as described in claim 5, wherein the step of providing a protective head cover further includes providing said sheet-like pieces of material each having an underside and an outerside and being adapted to fit about the head of the animal.

7. A process of protecting the ears of animals as described in claim 6, wherein the step of providing a protective head cover further includes providing said sheet-like pieces of material made from an insulating rubber material.

8. A process of protecting the ears of animals as described in claim 7 further includes the step of resting or disposing the ears of the animal between said strap means and the sheet-like pieces of material so that said strap means engages the head of the animal and does not engage across the ears of the animal.

9. A process of protecting the ears of animals as described in claim 6, wherein the step of providing a protective head cover further includes providing said sheet-like pieces of material made from neoprene.

10. A process of protecting the ears of animals as described in claim 9, wherein the step of positioning said protective head cover about the head of the animal further includes positioning said strap means behind the ears of the animal and also behind the crown of the head of the animal.

11. A process of protecting the ears of animals as described in claim 6, wherein the step of providing a protective head cover further includes providing said strap means which adjustably extends to said undersides of said connected sheet-like pieces of material and which are capable of being adapted so as to allow the ears of the animal to nondeformably fit between said strap means and said sheet-like pieces of material.

* * * * *